United States Patent Office 2,907,786
Patented Oct. 6, 1959

2,907,786

SULFONIC DERIVATIVES OF DITHIOCARBAMIC ACID AND METHOD OF MAKING THE SAME

Wolfgang Gündel, Dusseldorf-Oberkassel, Germany, assignor to Dehydag, Deutsche Hydrierwerke G.m.b.H., Dusseldorf, Germany, a corporation of Germany No Drawing. Application January 4, 1956
Serial No. 557,422

Claims priority, application Germany January 5, 1955

10 Claims. (Cl. 260—455)

This invention relates to sulfonic derivatives of dithiocarbamic acid, especially dithiocarbamic acid ester-N-alkylsulfonic acids, and a method of making such compounds.

I have discovered that novel derivatives of dithiocarbamic acid esters or salts thereof are obtained by first reacting salts of amino-alkanesulfonic acids which have at least one hydrogen atom attached to the nitrogen atom with carbon disulfide in the presence of equimolar amounts of a strong base, and thereafter transforming the salts of dithiocarbamic acid-N-alkylsulfonic acids produced thereby into the corresponding salts of dithiocarbamic acid ester-N-alkylsulfonic acids with the aid of an alkylating agent.

The compounds obtained in this manner may be represented by the structural formula

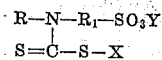
$$\begin{array}{c} R-N-R_1-SO_3Y \\ | \\ S=C-S-X \end{array}$$

wherein R is hydrogen or an alkyl, cycloalkyl or aryl radical, $R_1$ is a bivalent aliphatic radical, Y is a salt-forming cation and X is an aliphatic, aliphatic-aromatic or aromatic radical. R and $R_1$ may also be branched or substituted radicals, and X may similarly be a substituted radical. In those cases where the substituent carried by radical X is another sulfonic group, the compounds formed by the reaction in accordance with the present invention are of particular interest and have the general structural formula

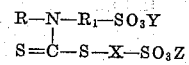
$$\begin{array}{c} R-N-R_1-SO_3Y \\ | \\ S=C-S-X-SO_3Z \end{array}$$

wherein R, $R_1$, X and Y represent the radicals above indicated, and Z is a salt-forming cation identical to or different from Y.

The production of these novel compounds is carried out in two steps, but it is not necessary to isolate the reaction product formed in the first step before proceeding with the second step. Therefore, the reaction according to my invention can actually be performed in a single uninterrupted procedure, despite the fact that the components react in two distinct phases. In general, it is advantageous to perform the reaction in an aqueous medium, but the usual organic solvents, such as lower molecular alcohols and ketones, may also be used as the reaction medium, if desired.

In the first phase of the reaction according to the present invention, salts of N-alkyl-, N-cycloalkyl- or N-aralkyl-aminoalkanesulfonic acids are reacted with carbon disulfide in the presence of equimolar amounts of a strong base, such as sodium hydroxide or potassium hydroxide, preferably in aqueous solution. This reaction takes place surprisingly smoothly if the reaction mixture is thoroughly agitated, either at room temperature or at a moderately elevated temperature, for example 40–50° C. The reaction has gone to completion when the carbon disulfide has gone completely into solution and the reaction mixture is substantially clear and no longer reacts alkaline. The rapid and practically quantitative course of this reaction could in no way have been predicted, primarily because it was not anticipated that the amino group, whose alkaline characteristics are considerably weakened by the presence of the sulfonic acid groups, would react so smoothly and completely with the carbon disulfide.

Examples of aminosulfonic acids whose salts may advantageously be employed in the first phase of the reaction, as above described, are the following:

2-ethylamino-ethane-1-sulfonic acid
3-n-butylamino-propane-1-sulfonic acid
4-cyclohexylamino-butane-1-sulfonic acid
3-benzylamino-propane-1-sulfonic acid
2′-ethylamino-3-ethylamino-propane-1-sulfonic acid
1,2-ethylenediamine-N,N′-bis-propane-ω-sulfonic acid
1,6-hexamethylenediamine-N,N′-bis-propane-ω-sulfonic acid and the like. In the case of those aminosulfonic acids which contain more than one amino group in the molecule, one or both of the amino groups can be caused to react in the above-described manner with the carbon disulfide.

The second phase of the process according to the present invention comprises the esterification of the dithiocarbamic acid salts produced in the first phase and having the general structural formula

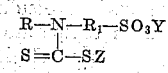
$$\begin{array}{c} R-N-R_1-SO_3Y \\ | \\ S=C-SZ \end{array}$$

with a substituting agent. In the above formula Y and Z represent salt-forming cations, such as alkali metal atoms. Compounds which may be used for this purpose are those which are customarily employed as substituting agents, such as dimethylsulfate, diethylsulfate, or other sulfuric or sulfonic acid esters, as well as compounds comprising sufficiently reactive halogen atoms, such as methyliodide, ethylbromide, allylchloride, benzylchloride, and the like. In the case of these aminosulfonic acids of the reaction are substituting agents which contain sulfonic acid groups or form sulfonic acid groups. Examples of such substituting agents are salts of halogenated sulfonic acids, such as salts of bromoethane-sulfonic acid or of halogenated arylsulfonic acids wherein the halogen atom has been made more susceptible to substitution by the introduction of anionic substituent on the aryl radical, for example 4-chloro-3-nitrobenzene-sulfonic acid. Other substituting agents which may be used are sultones, such as propanesultone, 1,4-butanesultone or technical mixtures of 1,3- and 1,4-butanesultone, and the like.

The second phase of the process, as above set forth, may also be carried out in aqueous solution. In general, relatively mild reaction conditions are sufficient to bring about a reaction between the various components, both in the first and the second phase, and the reaction product is recovered with good yields and without the formation of appreciable quantities of undesirable side-products.

When the reaction according to the present invention is carried out in an aqueous medium, the reaction products often precipitate in crystalline form from the reaction solution during the second phase, because many of the products are relatively insoluble in water. In those cases where the precipitation is incomplete or insufficient, the warm solution obtained at the end of the second phase is filtered in the presence of charcoal, and the filtrate is evaporated to dryness. The residual salt is then recrystallized from a suitable solvent, for example from a lower alcohol or from alcohol-water mixtures.

The resulting pure products are colorless and odorless crystalline substances, which are more or less soluble in water and may be stored for indefinite periods of time without decomposition.

The novel compounds produced by the above-described reaction are useful for a number of purposes. For example, they are very effective inhibitors and their use in that capacity is particularly advantageous in the treatment of metal surfaces with acid solutions where it is important to prevent even the slightest corrosive attack upon the metal. Similarly, the sulfonic dithiocarbamic acid derivatives disclosed herein are useful as anti-corrosion agents in general, as fungicides, as vulcanization accelerators, and especially as brighteners for electroplating baths, as described in co-pending application Serial No. 552,699, filed December 13, 1955.

The following examples will further illustrate the present invention and enable others skilled in the art to understand the invention more completely. It is to be understood, however, that I do not intend to limit the invention to the particular examples given below.

*Example I*

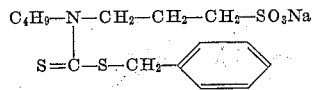

19.5 parts by weight of the internal salt of 3-butyl-amino-propane-1-sulfonic acid (1/10 mol) having a melting point of 162 to 163° C. (produced from equivalent amounts of n-butylamine and propane sultone) were dissolved in 100 parts by volume of 2 N sodium hydroxide (2/10 mol). The resulting solution was admixed with 7.6 parts by weight of carbon disulfide (1/10 mol) and vigorously stirred at room temperature until all of the carbon disulfide had gone into solution, which required about 2 hours. After adding 12.6 parts by weight benzyl chloride (1/10 mol), the mixture was stirred for 8 additional hours. The butyl-dithiocarbamic acid-benzylester-N-propane-ω-sodium sulfonate formed during this period is difficulty soluble in the reaction mixture, which contains sodium chloride, and is therefore substantially completely precipitated in finely crystalline form during the reaction. 30.5 parts by weight of the salt corresponding to 84% of the theoretical yield were isolated and obtained in analytically pure form by recrystallization from 80% alcohol.

*Example II*

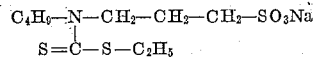

Following the procedure of the preceding example, an aqueous solution of butyl-dithiosodium carbaminate-N-propane-ω-sodium sulfonate was reacted gradually with 15.4 parts by weight of diethylsulfate (1/10 mol) accompanied by stirring, while allowing the temperature to rise to 40° C. The solution became clear after about 30 minutes and then 50 parts by volume of 2 N sodium hydroxide (1/10 mol) were added to neutralize the sulfuric acid formed during the reaction. Thereafter, the solution was evaporated to dryness under a hood with an adequate draft. The residue, a grayish crystalline substance, was first extracted with a small amount of cold isopropyl alcohol to remove malodorous impurities and thereafter recrystallized from 800 parts by volume of the same alcohol in order to separate the sodium sulfate formed during the reaction. The butyl-dithiocarbamic acid-ethylester-N-propane-ω-sodium sulfonate was obtained with good yields. It was a colorless, odorless salt which was readily soluble in water.

*Example III*

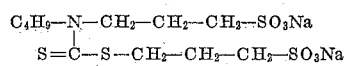

12.2 parts by weight propane sultone (1/10 mol) were gradually added to a solution of butyl-dithiosodiumcarbaminate-N-propane-ω-sodium sulfonate prepared in accordance with Example I, accompanied by stirring, while taking care that the temperature did not rise above 50° C. Thereafter, the mixture was stirred until it practically no longer reacted alkaline; it was finally evaporated to dryness on a water bath, as described in Example II. 42 parts by weight of butyl-dithiocarbamic acid-N-S-bis-propane-ω-sodium sulfonate, corresponding to 96% of the theoretical yield, remained behind. It was a colorless compound. By recrystallization from 95% alcohol, it was obtained in a form which was very easily soluble in water.

*Example IV*

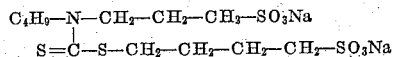

Working in close adherence to the procedure of the preceding example, but using 13.6 parts by weight of 1,4-butanesultone (1/10 mol) as the alkylating agent instead of propane sultone, produced excellent yields of the above butyl-dithiocarbamic acid-N-propane-S-butylester-ω,ω'-bis-sodium sulfonate, which was recrystallized from 35-times its amount of 80% isopropyl alcohol for the purpose of purification.

*Example V*

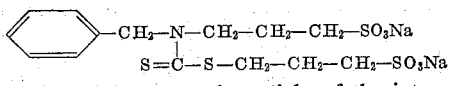

A solution of 22.9 parts by weight of the internal salt of 3-benzyl-aminopropane-1-sulfonic acid (1/10 mol), produced from molar amounts of benzylamine and 1,3-propane sultone, in 100 parts by volume of 2N sodium hydroxide (2/10 mol) was vigorously stirred at room temperature, after adding 7.6 parts by weight carbon disulfide until the latter had gone completely into solution (about 1 hour). To the clear solution 12.2 parts by weight of 1,3-propane sultone (1/10 mol) were added as described in Example III, and the solution was stirred until the alkaline reaction had practically disappeared. Thereafter, the solution was, if necessary, neutralized with dilute sulfuric acid and evaporated to dryness. The residue consisted of 47 parts by weight of N-benzyl-dithiocarbamic acid-N-S-bis-propane-ω-sodium sulfonate in virtually quantitative yields. This salt was very difficulty soluble in all organic solvents with the exception of methanol, and very readily soluble in water. It was recrystallized from a mixture of 3 parts isopropanol and 1 part methanol.

*Example VI*

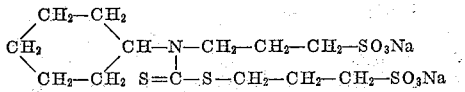

Proceeding according to the preceding example, but using 22.1 parts by weight of the internal salt of 3-cyclohexylaminopropane-1-sulfonic acid (1/10 mol) instead of the internal salt of 3-benzylaminopropane-1-sulfonic acid and an analogous separation procedure, 44.0 parts by weight of N-cyclohexyl-dithiocarbamic acid-N-S-bis-propane-ω-sodium sulfonate were obtained. This product was very difficult to purify by recrystallization but was obtained analytically pure by dissolving it in 300 parts by volume of warm methyl alcohol and precipitating it therefrom in crystalline form with 1000 parts by volume of warm isopropyl alcohol.

*Example VII*

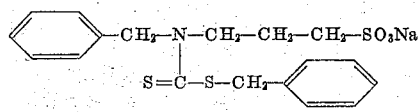

A solution of N-benzyldithiosodiumcarbaminate-N-propane-ω-sodium sulfonate, prepared according to the procedure of Example V from 22.9 parts by weight of the internal salt of 3-benzylamino-propane-1-sulfonic acid (1/10 mol), was admixed with 12.6 parts by weight of benzyl chloride, and the mixture was vigorously stirred at room temperature. The N-benzyldithiocarbamic acid-benzylester-N-propane-ω-sodium sulfonate formed thereby precipitated in crystalline form during the reaction and was separated from the reaction mixture by filtration after about 36 hours of stirring. The filter cake was then dried on clay. 23.2 parts by weight, corresponding to 55% of the theoretical yield of the salt, were obtained. For purposes of purification, the salt was recrystallized from a mixture of 1 part ethyl acetate and 3 parts isopropanol.

*Example VII*

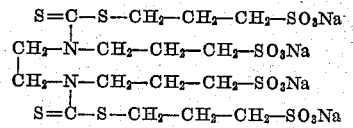

122 parts by weight 1,3-propane sultone were added to a solution of 30 parts by weight ethylene diamine (½ mol) in 500 parts by volume of alcohol, while taking care that the temperature did not exceed 50° C. After stirring this mixture for about 30 minutes at its boiling point, it was allowed to cool. The internal salt of ethylene diamine-N,N'-bis-propane-ω-sulfonic acid precipitated very slowly at the beginning but more rapidly as the solution cooled. The precipitate was then filtered off. For the purpose of purification the reaction product was recrystallized from a mixture composed of 30 parts methanol and 70 parts water. The crystalline product, which was only moderately soluble in water, had a melting point above 200° C. 10.4 parts of this salt (1/10 mol) were admixed with 200 parts by volume of 2N sodium hydroxide (1/10 mol) and 15.2 parts by weight of carbon disulfide (2/10 mol), as previously described, and the mixture was stirred until the carbon disulfide had passed completely into solution; i.e., after about 4 hours. After gradually adding 24.8 parts by weight of 1,3-propane sultone (2/10 mol) and keeping the temperature below 50° C., the mixture was stirred for a short period of time and thereafter evaporated to dryness. If necessary, the mixture was neutralized with a small amount of sulfuric acid prior to evaporation. The residue was ethylene-bis-dithiocarbamic acid-N-S-bis-propane-ω-sodium sulfonate; it was obtained with excellent yields. The product was thoroughly admixed with alcohol and then washed with alcohol on a vacuum filter; in this form it possessed the expected analytical values. The salt was very readily soluble in water but almost completely insoluble in all organic solvents.

While I have disclosed certain specific embodiments of my invention, it will be apparent to persons skilled in the art that various changes and modifications can be made without departing from the spirit of the invention or the scope of the appended claims.

I claim:

1. Compounds having the structural formula

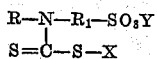

wherein R is selected from the group consisting of hydrogen, lower alkyl, cyclohexyl, monocyclic aryl and alkylamino radicals, $R_1$ is a bivalent alkyl radical, X is selected from the group consisting of lower alkyl, monocyclic aryl and lower alkyl sulfonic acid radicals and Y is an alkali metal atom.

2. Compounds having the structural formula

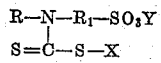

wherein R is a lower alkyl radical, $R_1$ is a bivalent lower alkyl radical, X is a lower aliphatic radical and Y is an alkali metal atom.

3. Compounds having the structural formula

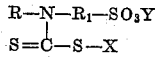

wherein R is a butyl radical, $R_1$ is a propyl radical, X is a lower alkylsulfonic radical and Y is an alkali metal atom.

4. Compounds having the structural formula

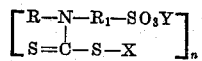

wherein R is selected from the group consisting of hydrogen, lower alkyl, cyclohexyl, monocyclic aryl and alkylamine radicals, $R_1$ is a bivalent alkyl radical, X is selected from the group consisting of lower alkyl, monocyclic aryl, and lower alkyl sulfonic acid radicals, Y is an alkali metal atom and $n$ is a whole number from 1 to 2.

5. The compound having the structural formula

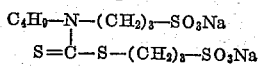

6. The compound having the structural formula

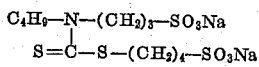

7. The compound having the structural formula

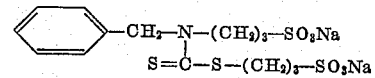

8. The compound having the structural formula

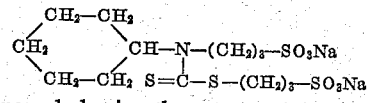

9. Compounds having the structural formula

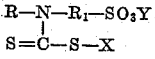

wherein R is a cyclohexyl radical, $R_1$ is a propyl radical, X is a propylsulfonic radical and Y is an alkali metal atom.

10. The compound having the structural formula

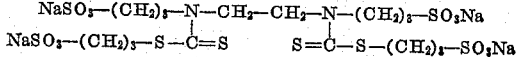

References Cited in the file of this patent

UNITED STATES PATENTS

| | | |
|---|---|---|
| 1,972,961 | Tisdale | Sept. 11, 1934 |
| 2,127,375 | Bousquet | Aug. 16, 1938 |
| 2,313,871 | Hanford et al. | Mar. 16, 1943 |
| 2,491,772 | Rudel | Dec. 20, 1949 |
| 2,673,839 | Kirshenbaum et al. | Mar. 30, 1954 |

FOREIGN PATENTS

| | | |
|---|---|---|
| 427,641 | Great Britain | Apr. 29, 1935 |
| 628,397 | Great Britain | Aug. 29, 1949 |

OTHER REFERENCES

Journal of the American Pharmaceutical Association, vol. XLIV, pages 310–313, Collins et al.

UNITED STATES PATENT OFFICE

CERTIFICATE OF CORRECTION

Patent No. 2,907,786                        October 6, 1959

Wolfgang Gündel

It is hereby certified that error appears in the printed specification of the above numbered patent requiring correction and that the said Letters Patent should read as corrected below.

Column 2, line 40, for "in the case of these aminosulfonic acids" read -- Especially important for the second phase --; column 5, line 13, for "Example VII", in italics, read -- Example VIII --, in italics.

Signed and sealed this 29th day of March 1960.

(SEAL)
Attest:

KARL H. AXLINE
Attesting Officer

ROBERT C. WATSON
Commissioner of Patents